US011631327B2

(12) United States Patent
Higuchi et al.

(10) Patent No.: US 11,631,327 B2
(45) Date of Patent: Apr. 18, 2023

(54) SYSTEMS AND METHODS FOR LEARNING DRIVER PARKING PREFERENCES AND GENERATING PARKING RECOMMENDATIONS

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/364,111

(22) Filed: Jun. 30, 2021

(65) Prior Publication Data

US 2023/0005368 A1    Jan. 5, 2023

(51) Int. Cl.
*G08G 1/14* (2006.01)
*G06N 3/08* (2006.01)
*G08G 1/0968* (2006.01)

(52) U.S. Cl.
CPC ............... *G08G 1/141* (2013.01); *G06N 3/08* (2013.01); *G08G 1/096838* (2013.01); *G08G 1/145* (2013.01)

(58) Field of Classification Search
CPC ..... G06V 20/58; G06V 20/586; B60W 30/06; B60W 60/001; G05D 1/0212; G08G 1/146; G08G 1/14
See application file for complete search history.

(56) References Cited

U.S. PATENT DOCUMENTS

| 9,767,690 | B2 | 9/2017 | Agrawal et al. |
| 9,811,085 | B1 | 11/2017 | Hayes et al. |
| 10,074,276 | B2 | 9/2018 | Gaebler et al. |
| 10,106,153 | B1 | 10/2018 | Xiao et al. |
| 10,372,141 | B2 | 8/2019 | Donnelly et al. |

(Continued)

OTHER PUBLICATIONS

Higuchi et al., "A Collaborative Approach to Finding Available Parking Spots," 2019 IEEE 90th Vehicular Technology Conference (VTC2019—Fall), pp. 1-5 (2019).

(Continued)

*Primary Examiner* — Mirza F Alam
(74) *Attorney, Agent, or Firm* — Christopher G. Darrow; Darrow Mustafa PC

(57) ABSTRACT

A method for automatically learning parking preferences for a driver and generating parking recommendations includes generating training data based at least in part on: 1) trajectory data indicating a trajectory of a vehicle during a plurality of parking events, each in which a driver of the vehicle selected a parking candidate from among a plurality of parking candidates, and 2) attribute data indicating attributes of each of the plurality of parking candidates, removing, from the training data, data associated with at least one available parking candidate based on one or more conditions that indicate the driver did not consider the at least one available parking candidate, and training a decision model, based on remaining training data, to estimate a preferred parking candidate for the driver from among a set of available parking candidates.

20 Claims, 5 Drawing Sheets

(56) References Cited

U.S. PATENT DOCUMENTS

| | | |
|---|---|---|
| 10,481,609 B2 | 11/2019 | Moosaei et al. |
| 10,896,609 B2 | 1/2021 | Higuchi et al. |
| 2015/0248835 A1* | 9/2015 | Aravkin .............. G08G 1/146 340/932.2 |
| 2016/0117925 A1 | 4/2016 | Akavaram et al. |
| 2017/0103654 A1* | 4/2017 | Gaebler ............ G01C 21/3617 |
| 2019/0220737 A1 | 7/2019 | Yao |
| 2019/0382001 A1 | 12/2019 | Chelian |
| 2020/0001862 A1* | 1/2020 | Luo .................... G06V 20/58 |
| 2020/0130676 A1 | 4/2020 | Smid |
| 2021/0380095 A1* | 12/2021 | Yan .................... B60W 30/06 |

OTHER PUBLICATIONS

Higuchi et al., "Monitoring Live Parking Availability by Vision-based Vehicular Cowdsensing," GlobeCom 2020—2020 IEEE Global Communications Conference, 2020, 3 pages (Abstract).

U.S. Appl. No. 17/026,449, filed Sep. 21, 2020, "Systems and Methods for Identifying Available Parking Spaces Using Connected Vehicles".

* cited by examiner

SYSTEMS AND METHODS FOR LEARNING DRIVER PARKING PREFERENCES AND GENERATING PARKING RECOMMENDATIONS

TECHNICAL FIELD

The subject matter described herein relates to systems and methods for determining a parking recommendation and parking navigation, and, more particularly, to novel techniques for a system to automatically learn driver parking selection preferences for determining parking recommendations and determining a path to a parking recommendation.

BACKGROUND

Parking a vehicle can be a time-consuming and frustrating task. While multiple parking spaces may be available at a venue, some parking spaces may satisfy a driver's preferences more than others, but the driver is not able to ascertain as much without spending time driving around the venue to investigate. Moreover, when a driver arrives at a venue, relatively few parking available spaces may be scattered widely across a parking zone. If the driver does not have time to search for a preferable parking space, the driver may be forced to take the first available parking space even if it is not preferable.

Furthermore, autonomous vehicles are becoming more prevalent and they may generally handle parking by traveling from a starting location to a destination at which the vehicle simply parks in the first available facility/parking space, or parks in a predetermined zone. The predefined zones or other first available parking selection of an autonomous vehicle may not satisfy the preferences of the passenger. In addition, a driver/passenger may not wish to spend the time required to define the predetermined zone according to their preferences or may make mistakes in doing so.

SUMMARY

In one embodiment, example systems and methods associated with parking preference estimation system are disclosed. The disclosed parking system can automatically learn driver parking selection preferences over time based on parking candidate decision comparisons without the need for the driver to manually input any parking preferences. For example, in one or more implementations the disclosed embodiments can use a hypothesis approach to generate training data over time, adjust the training data to eliminate less relevant data entries based on certain conditions, and train a decision model to estimate driver preferences based on the remaining training data.

Accordingly, in situations when multiple parking candidates may be available the disclosed system can receive a set of parking candidates as input to the decision model and output a parking recommendation that is estimated to be in line with driver preferences as learned from historical data.

Therefore, a system is disclosed for providing parking candidate recommendations. For example, in one approach the disclosed system includes a memory storing machine-readable instructions that, when executed by the processor, cause the processor to generate training data based at least in part on: 1) trajectory data indicating a trajectory of a vehicle during a plurality of parking events, each in which a driver of the vehicle selected a parking candidate from among a plurality of parking candidates, and 2) attribute data indicating attributes of each of the plurality of parking candidates, remove, from the training data, data associated with at least one available parking candidate based on one or more conditions that indicate the driver did not consider the at least one available parking candidate, and train a decision model, based on remaining training data, to estimate a preferred parking candidate for the driver from among a set of available parking candidates.

In another approach, a disclosed method includes generating training data based at least in part on: 1) trajectory data indicating a trajectory of a vehicle during a plurality of parking events, each in which a driver of the vehicle selected a parking candidate from among a plurality of parking candidates, and 2) attribute data indicating attributes of each of the plurality of parking candidates, removing, from the training data, data associated with at least one available parking candidate based on one or more conditions that indicate the driver did not consider the at least one available parking candidate; and, training a decision model, based on remaining training data, to estimate a preferred parking candidate for the driver from among a set of available parking candidates.

In one embodiment, a non-transitory computer-readable medium is disclosed. The computer-readable medium stores instructions that when executed by one or more processors cause the one or more processors to perform the disclosed functions. The instructions include instructions to generate training data based at least in part on: 1) trajectory data indicating a trajectory of a vehicle during a plurality of parking events, each in which a driver of the vehicle selected a parking candidate from among a plurality of parking candidates, and 2) attribute data indicating attributes of each of the plurality of parking candidates, remove, from the training data, data associated with at least one available parking candidate based on one or more conditions that indicate the driver did not consider the at least one available parking candidate, and train a decision model, based on remaining training data, to estimate a preferred parking candidate for the driver from among a set of available parking candidates.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
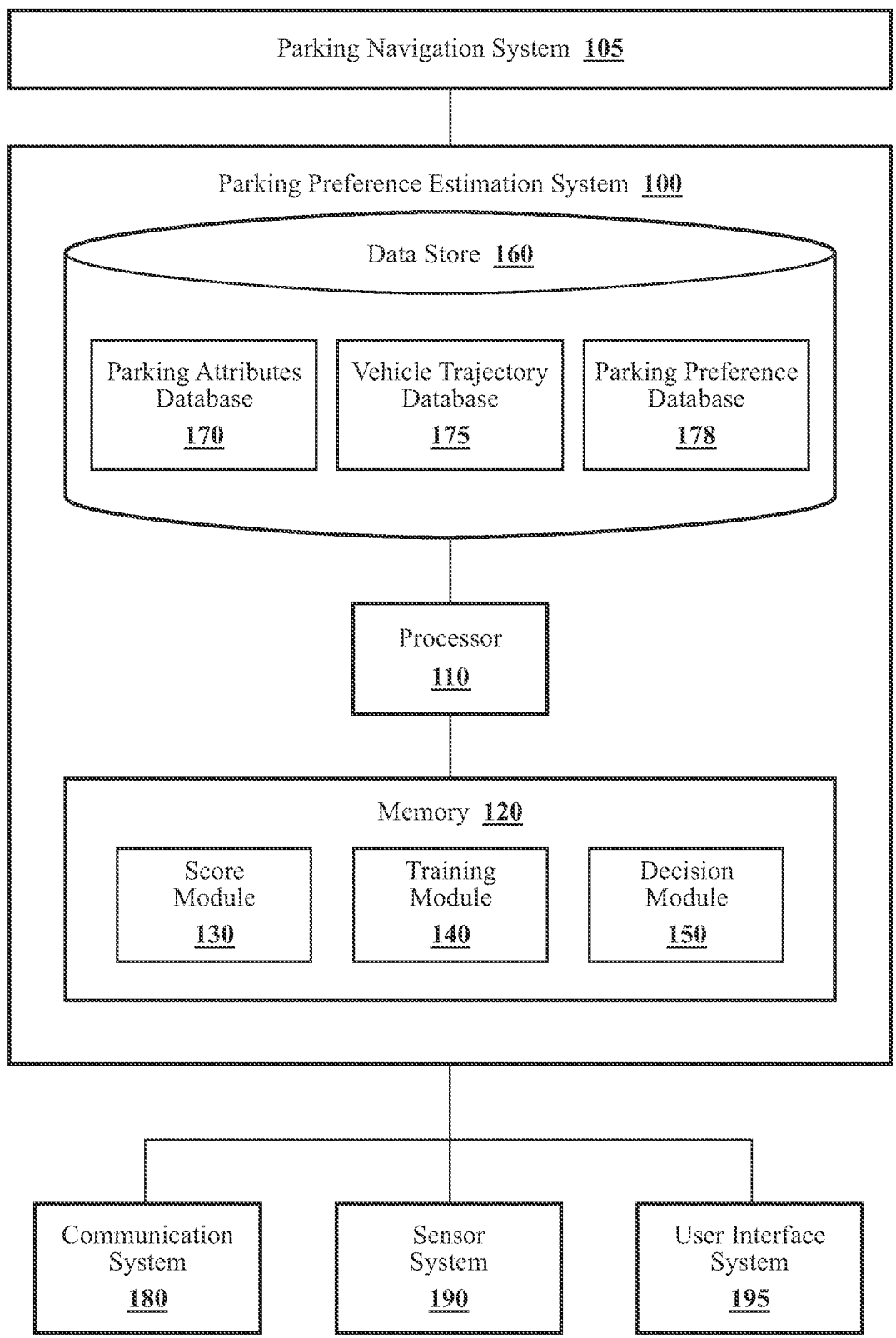
FIG. 1 illustrates one embodiment of a parking preference estimation system according to the disclosed subject matter.

Systems, methods and embodiments disclosed herein are associated with novel techniques for learning driver parking preferences and for generating parking recommendations and directions based thereon. As used herein "driver" refers to an individual operating a vehicle, either as a manual driver or an operator/passenger of an autonomous or semi-autonomous vehicle. A driver, as such, may prefer that his/her vehicle be parked in a parking area and/or parking space that meets certain criteria. For example, a driver may prefer to park his/her electric vehicle in a parking area that includes charging stations, or a may prefer to park in a parking space that is covered or near a particular entrance to a mall. Typically, if a driver prefers a parking area/space with particular attributes, the driver must expend time and effort driving around, manually searching for available parking candidates that meet the preferred criteria.

Furthermore, although the driver may be aware of his/her preferences, the driver may not wish to spend time or energy inputting instructions into a system, e.g., a vehicle system, to enable the system to assist in locating a preferred parking candidate (i.e., a preferred parking area, preferred parking space, etc.).

To solve these problems, embodiments of a parking preference estimation system and associated methods are disclosed herein to automatically learn driver preferences regarding parking candidate criteria, automatically recommend a parking candidate from among a plurality of available parking candidates and generate directions to the parking candidate. The disclosed parking preference estimation system can, in one or more embodiments, use a hypothesis approach to create a decision model for a given driver based on historical data that indicate the driver's actions in parking events, including the driver's selections of parking candidates and decisions to bypass available parking candidates.

The parking preference estimation system can generate training data based on the historical data and train the decision model to estimate which parking candidate out of a plurality of parking candidates the driver would prefer. In one or more embodiments, the parking preference estimation system improves the quality of the training data (and thereby the performance of the decision model) by eliminating data associated with at least one available parking candidate from the training data based on one or more conditions. The one or more conditions can indicate that the at least one available parking candidate was likely noticed but not considered by the driver during the parking event due to one or more aspects of the environment.

As used herein, a "parking event" refers to a sequence of maneuvers leading up to and concluding with the parking of the vehicle. A "parking candidate" refers to either a parking area (e.g., a garage, parking lot, roadside parking, etc.) or an individual parking space. An "available parking candidate" refers to a parking candidate that is currently open for a vehicle to park in. An "available parking space" refers specifically to a parking space that is currently unoccupied.

In one or more embodiments, to obtain the training data the disclosed parking preference estimation system automatically identifies one or more attributes of an available parking space and determines a respective score for the attribute that can be used to characterize the attribute. As used herein, "attributes" refers to one or more of: 1) physical characteristics of a parking space (e.g., width, length, in shade, covered, uncovered, space between parking lines and a nearest parked car, etc.); 2) contextual characteristics of the parking space (e.g., proximity to an entrance, proximity to a specific object such as charge station or cart return station, etc.); 3) regulatory characteristics of the parking space (e.g., a regulatory status of a space, such as handicap parking or reserved space or visitor space, cost to park in the space, etc.); or 4) other traits associated with a parking candidate and/or environment around the parking candidate.

Generally, the disclosed parking preference estimation system can identify available parking candidates and attributes of the available parking candidates based on, for example: 1) retrieving metadata about the available parking candidates from a database (e.g., a map database) according to a current location of the subject vehicle, 2) using one or more machine perception components to analyze sensor data and identify signs proximate to the parking candidates, characteristics of the surrounding environment, and/or markings on a surface of the ground in a vicinity of the parking candidate, 3) communicating with a parking area system to retrieve the attributes, etc.

Referring to FIG. 1, one embodiment of a parking preference estimation system 100 is illustrated. While arrangements will be described herein with respect to the parking preference estimation system 100, it will be understood that embodiments are not limited to a unitary system as illustrated. In some implementations, the parking preference estimation system 100 may be embodied, for example, as a cloud-computing system, a cluster-computing system, a distributed computing system, a software-as-a-service (SaaS) system, or part of a vehicle operation system. The parking preference estimation system 100 is illustrated and discussed as a single device for purposes of facilitating clear description and discussion but should not be interpreted to limit the overall possible configurations in which the disclosed components may be configured. For example, the separate modules, memories, databases, and so on may be distributed among various computing systems in varying combinations.

In one or more embodiments, the parking preference estimation system 100 is communicably connected to a parking navigation system 105. The parking navigation system 105 can obtain a current position and destination of vehicle as input, determine a travel path for the vehicle, and identify available parking candidates along the travel path. The parking navigation system 105 can provide the available parking candidates as input to the parking preference estimation system 100, which can output a recommended parking candidate or ranking of candidates. Upon receiving the recommended parking candidate or ranking of candidates, the parking navigation system 105 can determine a recommended route to an available parking facility/space. In some embodiments, the parking navigation system 105 offers facility-level navigation, which guides a user to a recommended parking facility (e.g., parking lot, roadside parking, etc., within a geographical area). In some embodiments, the parking navigation system 105 may additionally offer space-level parking navigation within the recommended parking facility.

The parking preference estimation system 100 includes various elements. It will be understood that in various embodiments it may not be necessary for the parking preference estimation system 100 to include all of the elements shown in FIG. 1. The parking preference estimation system 100 can have any combination of the various elements shown in FIG. 1. Further, the parking preference estimation system 100 can have additional elements to those shown in FIG. 1. In some arrangements, the parking preference estimation system 100 may be implemented without one or more of the elements shown in FIG. 1. Further, while the various elements are shown as being located within the parking preference estimation system 100 in FIG. 1, it will be understood that one or more of these elements can be located external to the parking preference estimation system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the parking preference estimation system 100 is implemented to perform methods and other functions as disclosed herein relating to learning driver parking preferences and generating parking recommendations. The noted functions and methods will become more apparent with a further discussion of the figures. Furthermore, the parking preference estimation system 100 is shown as including a processor 110. In various implementations, the processor 110 may be a part of the parking preference estimation system 100, the parking preference estimation system 100 may access the processor 110 through a data bus or another communication pathway, the processor 110 may be a remote computing resource accessible by the parking preference estimation system 100, and so on. In any case, the processor 110 is an electronic device such as a microprocessor, an ASIC, or another computing component that is capable of executing machine-readable instructions to produce various electronic outputs therefrom that may be used to control or cause the control of other electronic devices.

In one embodiment, the parking preference estimation system 100 includes a memory 120. The memory 120 can store machine-readable instructions that, when executed by the processor 110, cause the processor 110 to execute various actions, functions or tasks as described below. In one or more embodiments, the memory 120 can store, among other things, a score module 130, a training module 140 and a decision module 150. The memory 120 can be implemented as a random-access memory (RAM), read-only memory (ROM), a hard-disk drive, a flash memory, or other suitable memory for storing the modules 130, 140 and 150. The modules 130, 140 and 150 are, for example, constructed as computer-readable instructions that when executed by the processor 110 cause the processor 110 to perform the various functions disclosed herein. In various embodiments, the modules 130, 140 and 150 can be implemented in different forms that can include but are not limited to hardware logic, an ASIC, components of the processor 110, instructions embedded within an electronic memory, and so on.

With continued reference to the parking preference estimation system 100, in one embodiment, the parking preference estimation system 100 includes a datastore 160. The datastore 160 is, in one embodiment, an electronic data structure stored in the memory 120, a distributed memory, a cloud-based memory, or another type of data storage and that is configured with routines that can be executed by the processor 110 for storing data, analyzing stored data, providing access to stored data, organizing stored data, and so on. Thus, in one embodiment, the datastore 160 stores data and/or databases used by the modules 130, 140 and 150 in executing various determinations and functions disclosed herein. Such data and/or databases can include a parking attributes database 170, which stores characteristics and attributes of parking candidates, a vehicle trajectory database 175, which stores historical geographical locations and parking events of user vehicles, and a parking preference database 178, which stores driver preference estimates in the form of parking preference models associated with participating vehicles.

In one or more embodiments, the parking attributes database 170 maintains attribute data associated with one or more types of attributes of parking candidates (e.g., parking facilities or parking spaces). Some example parking facility attributes can include: the number of available spaces, the total number of parking spaces, the number of electric vehicle (EV) charging stations, the number of available EV charging stations, geographical locations of the facility, geographical locations of parking entrances, geographical locations of points-of-interest around the parking facility, parking fee, parking regulations, customer reviews, average arrival rate of vehicles, ease of parking indicator (e.g., average size of parking spaces, etc.), recent history of availability, etc. Some example parking space attributes can include: current availability, recent history of availability, estimated time when the space becomes available, average arrival rate of vehicles, EV charging station proximity, handicapped parking designation, compact car parking designation, dimension of the parking space, geographical location of the parking space, safety indicator (e.g., distance from security cameras/street lights, etc.), ease of parking indicators (e.g., if the space is located at a corner of a parking lot, traffic volume of the adjacent road segment, availability of adjacent spaces, etc.), covering, etc.

In one or more embodiments, the vehicle trajectory database 175 stores location data associated with one or more participating vehicles that utilize the services of the parking preference estimation system 100. For example, in one or more embodiments a participating vehicle can periodically upload its position information to the parking preference estimation system 100, which in response securely stores the information in the vehicle trajectory database 175. In another embodiment, the participating vehicle can upload parking event information to the parking preference estimation system 100 upon detecting the engine being turned off. In any case, in one or more embodiments the parking preference estimation system 100 obtains trajectory and or path information indicating a driver's navigational decisions in a vehicle leading up to parking events over a period of time and stores this information securely in the vehicle trajectory database 175.

The parking preference estimation system 100 can be communicably connected to other systems and components, such as the parking navigation system 105, a communication system 180, a sensor system 190, and a user interface system 195. The modules 130, 140, and 150 of the parking preference estimation system 100 can communicate with and receive data from such systems.

The modules 130, 140, and 150 of the parking preference estimation system 100 can execute various functions to enable the parking preference estimation system 100 to provide customized parking recommendations that estimate a driver's parking preference.

In one or more embodiments, the training module 140 includes instructions that cause the processor 110 to obtain 1) trajectory data indicating a trajectory of a vehicle during a plurality of parking events, each in which a driver of the vehicle selected a parking candidate from among a plurality of parking candidates, and 2) attribute data indicating attributes of each of the plurality of parking candidates, and to generate training data based at least in part on the trajectory data and the attribute data. In one or more embodiments, the training module 140 can also remove from the training data, data associated with at least one parking candidate based on one or more conditions that indicate the driver did not consider the at least one parking candidate. The use of such conditions, as discussed further below, can identify parking candidates that a specific driver determines to have little to no desirability and thus may negatively impact training of decision model.

In one or more embodiments, the score module 130 includes instructions that cause the processor 110 to calculate one or more criterion scores, respectively, for each available parking candidate along a path traveled by or to be traveled by a subject vehicle leading up to a parking event. The criterion scores can function as part of the attribute data that measure one or more attributes or characteristics of a parking candidate. For example, in one or more embodiments the criterion scores can include values that measure or indicate one or more of: distance from the parking space to user's destination (e.g., store front), distance to drive from user vehicle's current location to the parking space, number of available parking spaces in the vicinity, likelihood that the parking space remains available until the user vehicle arrives at the space, likelihood that the user can find an alternative space in the vicinity (e.g., in the same parking block) in case the first recommended space is taken by another vehicle before the user vehicle arrives, ease of parking (e.g., availability of adjacent spaces, size of the space with respect to the vehicle dimension, whether the space is located at a corner of the parking lot, proximity to roads with high traffic volume, etc.), safety (e.g., distance from security cameras, streetlights, etc.), special designations such as handicapped parking, EV parking, compact car parking, etc.

In one or more embodiments, the decision module 150 includes instructions that cause the processor 110 to train a decision model, based on remaining training data, to estimate a preferred parking candidate for a driver from among a set of available parking candidates. That is, the decision model can receive as input of a set of available parking candidates and output a recommended parking candidate or a ranking of parking candidates. Based on the output of the decision model, the parking navigation system 105 can generate directions to navigate the subject vehicle to a recommended or top ranked parking candidate.

As previously mentioned, the parking preference estimation system 100 can communicate with and receive data from the communication system 180, the sensor system 190, and the user interface system 195. The communication system 180 can be configured to communicate, for example, over a local area network, a wide area network, directly with another system via an established protocol such as vehicle-to-everything (V2X), vehicle-to-vehicle (V2V), or through other communications methods. The sensor system 190 can include a global positioning system (GPS) receiver that can provide location information about the subject vehicle and one or more sensors, for example, a radar, a camera, a lidar, a thermal sensor, an ultrasonic sensor and/or other types of sensors that can provide information about an environment around the subject vehicle. The user interface system 195 can be implemented as part of an interface installed in the subject vehicle, for example, including a touch screen, a scroll wheel, a keypad or another type of input device that can receive input data from a user, and a display device that can display output data. The user interface system 195 can alternatively be implemented in other forms, for example, as an application installed on a user device that is in electronic communication with the parking preference estimation system 100.

Details of operation of the disclosed parking preference estimation system 100 will now be discussed with reference to FIG. 2, which shows a block diagram of operations of the parking preference estimation system 100 and parking navigation system 105.

Generally, the parking navigation system 105 obtains the current position and destination of vehicle as input and, in coordination with the parking preference estimation system 100, responds with a recommended route to an available parking lot/space. In some embodiments, the parking navigation system 105 offers facility-level navigation, which guides a user to a recommended parking facility (e.g., parking lot, roadside parking, etc.). In some embodiments, the parking navigation system 105 can additionally offer space-level parking navigation within the recommended parking facility. To provide these functions, the parking navigation system 105 and the parking preference estimation system 100 can perform learning phase and recommendation phase operations.

In the learning phase, the parking preference estimation system 100 and the parking navigation system 105 obtain trajectory data and attribute data associated with a plurality of parking events completed by a subject vehicle 205 to generate training data and use conditional analysis to adjust the training data.

Figure 2:
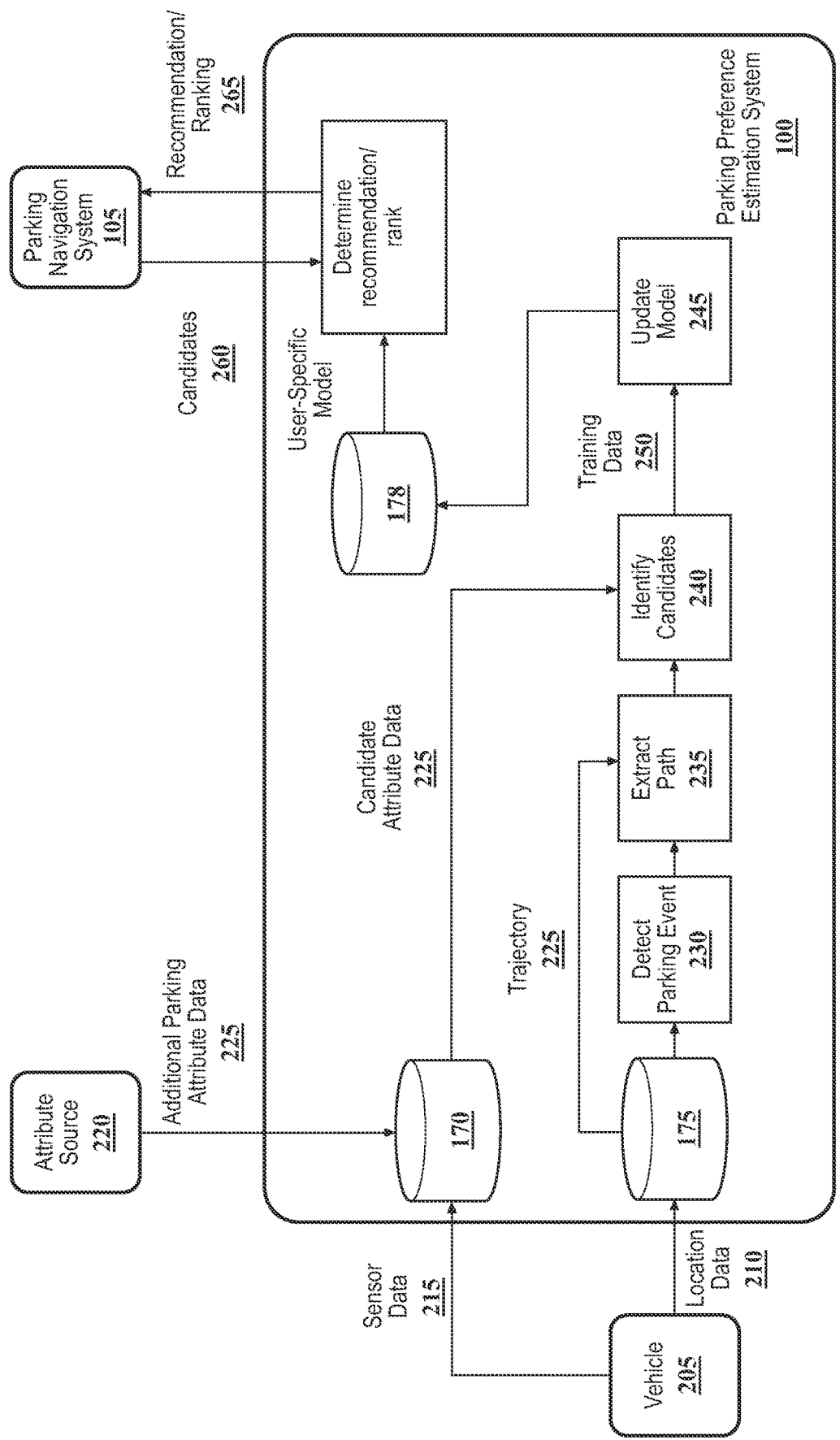
FIG. 2 illustrates an example block diagram showing operations of a parking preference estimation system and a parking navigation system according to the disclosed subject matter.

As shown in FIG. 2, in one or more embodiments the parking preference estimation system 100 can, over time, obtain location data 210 associated with multiple parking events completed by the subject vehicle 205 and store the information in the vehicle trajectory database 175. For example, in one or more embodiments the subject vehicle 205 can transmit the location data 210 to the parking preference estimation system 100 when the subject vehicle 205 completes a parking event. In one or more embodiments the location data 210 can include geographical location data, such as map path data, GPS point data, or other information that can provide details of a path navigated by the subject vehicle 205.

In addition, in one or more embodiments the subject vehicle 205 can transmit sensor data 215 indicating attributes of available parking candidates detected along a path navigated by the subject vehicle 205. For example, for the purposes of determining a parking space recommendation, the attributes can include, dimension of the parking space, geographical location of the parking space, safety indicator (e.g., distance from security cameras/streetlights, etc.), ease of parking indicators, etc., as described above. For the purposes of determining a parking facility (e.g., garage, parking lot, etc.) recommendation, the attributes can include, for example, the number of available spaces detected, the total number of parking spaces, the number of electric vehicle (EV) charging stations, etc., as described above. The parking preference estimation system 100 can store the attributes in the parking attributes database 170.

Furthermore, in one or more embodiments the parking preference estimation system 100 can obtain additional attribute data 225 from other attribute sources 220, such as sensor data from other participating vehicles, data from facilities, data from stationary cameras, etc. Accordingly, the parking preference estimation system 100 can obtain data that will function as the basis for training data to train a decision model for the subject vehicle 205.

The parking preference estimation system 100 can defer generating a parking recommendation for the subject vehicle 205 during the learning phase. For example, the parking preference estimation system 100 can defer generating a parking recommendation until after the parking preference estimation system 100 has obtained a threshold amount of data in the parking attributes database 170 and the vehicle trajectory database 175 associated with the subject vehicle 205. After the threshold amount of data associated with the subject vehicle 205 has been obtained, the parking preference estimation system 100 can operate in the recommendation phase for the subject vehicle 205.

In the recommendation phase, the parking navigation system 105 can request a parking recommendation for the subject vehicle 205 based on available parking candidates 260 identified on a current or upcoming route of the subject vehicle 205. The parking navigation system 105 can identify parking candidates 260, i.e., candidate parking lots (for facility-level navigation) or candidate available parking spaces (for space-level navigation), based on one or more different information sources. The parking preference estimation system 100 can return a recommended parking candidate 265 based on a ranking of the parking candidates 260, as will be discussed below.

In one or more embodiments the parking navigation system 105 can identify parking candidates 260 based on stored or downloaded map data. In one or more embodiments, the parking navigation system 105 can obtain relevant information from external systems to aid in identifying parking candidates 260. For example, a parking facility security camera, a road-side camera or other sensor infrastructure can monitor a parking area and in so doing generate data (e.g., image data, video data, etc.) that can be used to identify available parking spaces at a parking facility or a street. The parking navigation system 105 can obtain the data and determine occupancy/vacancy of a parking space by applying an image processing algorithm, e.g., to video streams from security cameras. In one or more embodiments, the parking navigation system 105 can collect data from occupancy sensors that detect the presence of vehicles in parking spaces by wireless signals. In other embodiments, the parking navigation system 105 can determine availability of parking spaces based on data obtained from on-board sensors (e.g., cameras, sonars, radars, lidars, etc.) of participating vehicles that travel in a parking facility.

Other techniques can be used to identify parking candidates 260. In any case, the parking navigation system 105 obtains/processes information (e.g., from a facility, from sensor infrastructure, from other vehicles, etc.) to identify available parking candidates 260 and transmits the available parking candidates 260 to the parking preference estimation system 100.

Upon receiving the available parking candidates 260, the parking preference estimation system 100 can search the vehicle trajectory database 175 and retrieve trajectory data associated with parking events completed by the subject vehicle 205 at operation 230. For each of a plurality of parking events, the parking preference estimation system 100 can determine a parking search path at operation 235. The parking search path, or search path, refers to a segment of vehicle navigational trajectory during which the driver is searching for a parking candidate (i.e., a parking facility or a parking space). The search path ends with completion of the parking event and starts at a determined location, distance or time before the completion of the parking event. That is, generally the search path does not include an entire navigational path of the subject vehicle 205, but only the final portion leading up to the parking event.

In one or more embodiments, the parking preference estimation system 100 can determine a starting point for the search path based on the type of parking candidate recommendation requested by the parking navigation system 105. For example, in one or more embodiments when the parking candidate 260 is a facility the parking preference estimation system 100 can determine the starting point of the search path to be a predetermined distance (e.g., 500 meters) from the location of parking event. When the parking candidate 260 is a parking space, the parking preference estimation system 100 can determine the starting point of the search path to be an entry point to the parking facility, etc., based on map data.

The parking preference estimation system 100 can identify available parking candidates 260 along or around the search path at operation 240. For facility-level recommendations, the parking preference estimation system 100 can identify all parking facilities around the parking search path based on map data. In some embodiments, the parking preference estimation system 100 may retrieve available parking facilities whose distance from the parking search path is no more than a predefined threshold. For space-level recommendations, the parking preference estimation system 100 can identify available parking spaces along the parking search path, e.g., within a parking facility or along a street.

Based in part on data indicating a plurality of search paths, available parking candidates and selected parking candidates 260, the parking preference estimation system 100 can generate training data 250 to train or update a parking preference model (e.g., a decision model) that is tailored to the subject vehicle 205 at operation 245. The parking preference estimation system 100 can store the decision model in the parking preferences database 178.

For clarity, the following description will focus on parking space preference estimation. However, it should be understood that similar mechanisms can be applied to parking facility preference recommendations as well.

Figure 3:
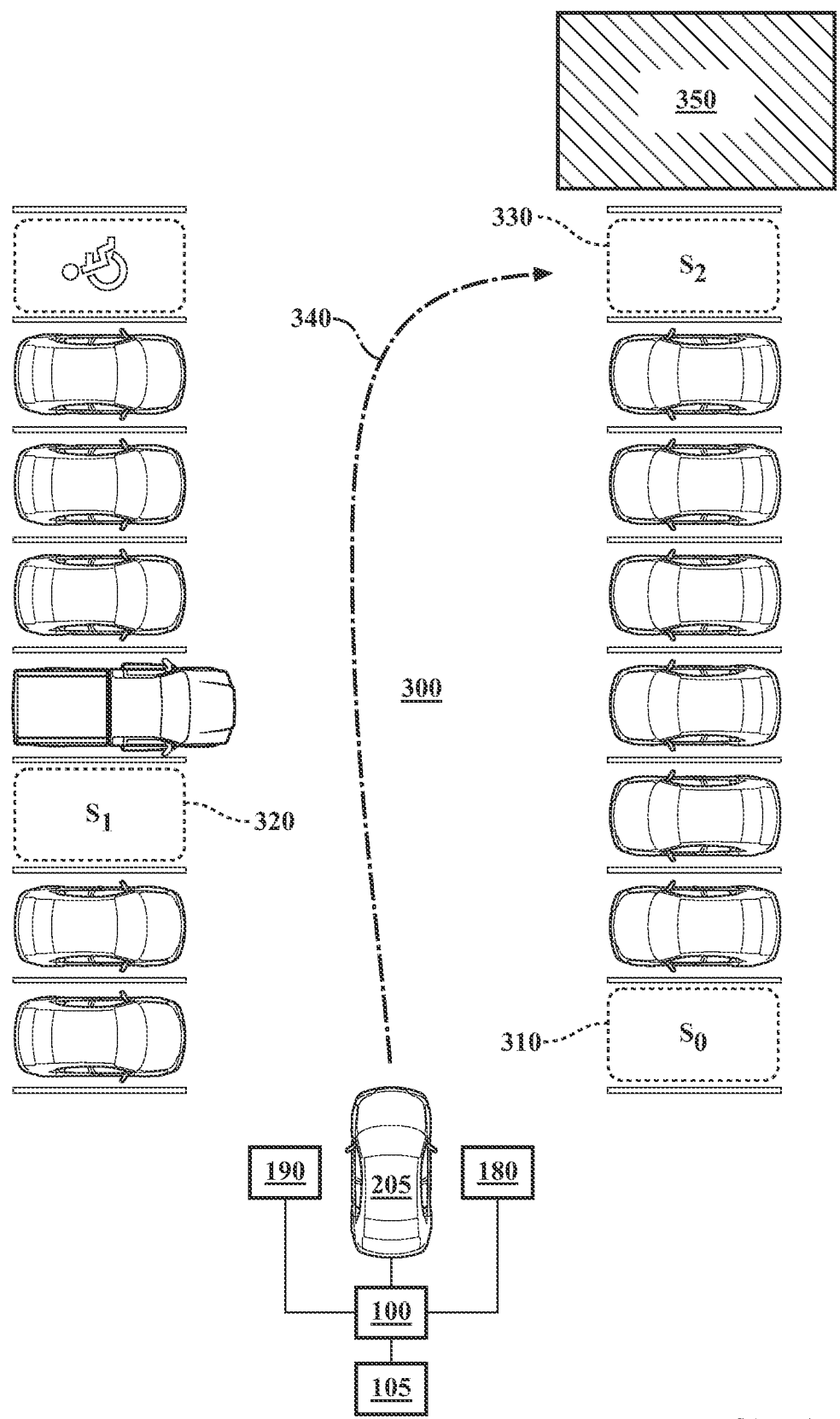
FIG. 3 illustrates an example of a vehicle parking path according to the disclosed subject matter.

FIG. 3 shows an example search path 340 of a subject vehicle 205 navigating a parking area 300 to complete a parking event. The parking area 300 can include, for example, an EV charging station 350. The available parking spaces along the search path 340 include, e.g., parking spaces 310, 320, 330. The parking spaces 310, 320, 330 are merely an example. More or fewer parking spaces may be available, and the search path 340 can be longer or shorter. Therefore, generally, let $s_0, s_1, \ldots, s_n$ be the set of available parking spaces.

In the parking event, the driver parks the subject vehicle 205 in space $s_n$ at the end of the parking search path 340. For each of the spaces $s_0, s_1, \ldots, s_n$, the parking preference estimation system 100 can calculate respective criterion-wise scores according to one or more criteria that characterize attributes of a parking space. Criteria can include, for example, attributes such as distance from the parking space to user's destination (e.g., store front), distance to drive from user vehicle's current location to the parking space, number of available parking spaces in the vicinity, likelihood that the parking space remains available until the user vehicle arrives at the space, likelihood that the user can find an alternative space in the vicinity (e.g., in the same parking block) in case the first recommended space is taken by another vehicle before the user vehicle arrives, ease of parking (e.g., availability of adjacent spaces, size of the space with respect to the vehicle dimension, whether the space is located at a corner of the parking lot, proximity to roads with high traffic volume, etc.), safety (e.g., distance from security cameras, streetlights, etc.), special designations such as handicapped parking, EV parking, compact car parking, etc.

Let $x_{i,1}, x_{i,2}, \ldots, x_{i,m}$ be criterion-wise scores based on m number of criteria calculated for space $s_i$. In one or more embodiments, each criterion-wise score is defined as a real number between 0 and 1. Generally, a likelihood of a driver selecting a candidate parking space $s_i$ can be characterized as a utility function of criterion-wise scores: $f_j(x_{i,1}, x_{i,2}, \ldots, x_{i,m})$. The utility function $f_j$ can output a utility value and may differ among different drivers since individual drivers can place different priorities on each criterion. To account for this variation, the parking preference estimation system 100 can generate a personalized utility function $f_j$ as a decision model for each driver (i.e., for each vehicle having representative data in the vehicle trajectory database 175).

To create the decision model, the parking preference estimation system 100 utilizes an assumption that the driver of the subject vehicle 205 considered and compared the available parking spaces $s_0, s_1, \ldots, s_n$, according to his/her preference and, as a result, selected the space where he/she parked the subject vehicle 205. In other words, the parking preference estimation system 100 applies the following hypotheses:

$$f_j(x_{1,1}, x_{1,2}, \ldots, x_{1,m}) \leq f_j(x_{n,1}, x_{n,2}, \ldots, x_{n,m})$$

$$f_j(x_{2,1}, x_{2,2}, \ldots, x_{2,m}) \leq f_j(x_{n,1}, x_{n,2}, \ldots, x_{n,m})$$

$$\ldots$$

$$f_j(x_{n-1,1}, x_{n-1,2}, \ldots, x_{n-1,m}) \leq f_j(x_{n,1}, x_{n,2}, \ldots, x_{n,m})$$

The parking preference estimation system 100 can apply a similar set of hypotheses for every parking event detected for the driver of subject vehicle 205. The parking preference estimation system 100 can use these hypotheses as training data (e.g., unsupervised labeled data) to estimate the driver's parking selection preferences.

FIG. 3 shows three available spaces parking spaces 310, 320, 330 ($s_0$, $s_1$ and $s_2$) along the parking search path 340, which ultimately ends at selected space 330 ($s_2$). For each parking event, the parking preference estimation system 100 can calculate per-criterion scores $f_j(s_i)$ for each available parking candidate along the search path. Under the hypothesis approach, the parking preference estimation system 100 can train the decision model $f_j$ such that:

$$f_j(s_0) \leq f_j(s_2),$$

$$f_j(s_1) \leq f_j(s_2),$$

and similarly continue the training for a plurality of parking events to improve the model.

To further improve the accuracy of the hypothesis approach, in one or more embodiments the parking preference estimation system 100 can utilize a set of conditions when generating the training data to identify and remove samples that are likely to be irrelevant to the decision process of a given driver. For example, as one condition the parking preference estimation system 100 can determine to include data associated with an available space $s_i$ in the hypothesis $f_j(x_{i,1}, x_{i,2}, \ldots, x_{i,m}) \leq f_j(x_{n,1}, x_{n,2}, \ldots, x_{n,m})$ analysis only if the speed of the subject vehicle 205 is less than a predefined threshold when the subject vehicle 205 is passing the available space $s_i$. In applying this condition, it is assumed that speed is an indicator of attention, which in turn is an indicator or evidence of consideration. When the subject vehicle 205 moves faster than the threshold while passing $s_i$, the parking preference estimation system 100 can determine that the driver did not consider $s_i$ as a relevant candidate space to a degree that warrants inclusion in the decision model training data.

Using conditions to identify and remove less relevant samples from the training data can improve the accuracy of the decision model estimations. The parking preference estimation system 100 may additionally/alternatively apply one or more other conditions to identify samples for removal from the training data based, for example, on a change of vehicle speed (deceleration or acceleration) or based on a lateral distance threshold to the parking space when passing $s_i$.

After the conditional removals, the parking preference estimation system 100 can use the remaining training data to train a decision model that is tailored to the specific driver of the subject vehicle 205. In one or more embodiments, the parking preference estimation system 100 executes a regression technique based on the training data to estimate the utility function $f_j$ of the decision model, for each user j, that best satisfies inequalities in the training data or best maps input (e.g., attribute indicators of a set of available candidates) to desired output (e.g., selected candidate). In one or more embodiments, the parking preference estimation system 100 can use linear regression, logistic regression, deep neural network-based regression, or other types of regression techniques using the hypothesis approach for generation of unsupervised labeled data to determine the utility functions.

In one or more embodiments, the parking preference estimation system 100 can use the utility function $F_j$ to calculate a utility value of candidate parking spaces that are received from the parking navigation system 105 and determine rankings of the candidates accordingly. In one or more embodiments, the parking navigation system 105 selects the candidate with the highest utility value as the recommended candidate.

In one or more embodiments, instead of directly estimating the utility function $f_3$ the parking preference estimation system 100 can use decision trees to model a driver's parking selection. In this case, the decision tree takes factor-wise utility scores of a pair of candidate parking spaces $s_a$ and $s_b$ as input and estimates which candidate parking space the driver prefers, e.g.

Input: $(x_{a,1}, x_{a,2}, \ldots, x_{a,m}), (x_{b,1}, x_{b,2}, \ldots, x_{b,m})$ Output: $s_a$ or $s_b$ The parking preference estimation system 100 can train a decision tree for a driver of given vehicle using the training data associated with the vehicle. The parking preference estimation system 100 can train multiple decision trees corresponding respectively to drivers of multiple vehicles.

Figure 4:
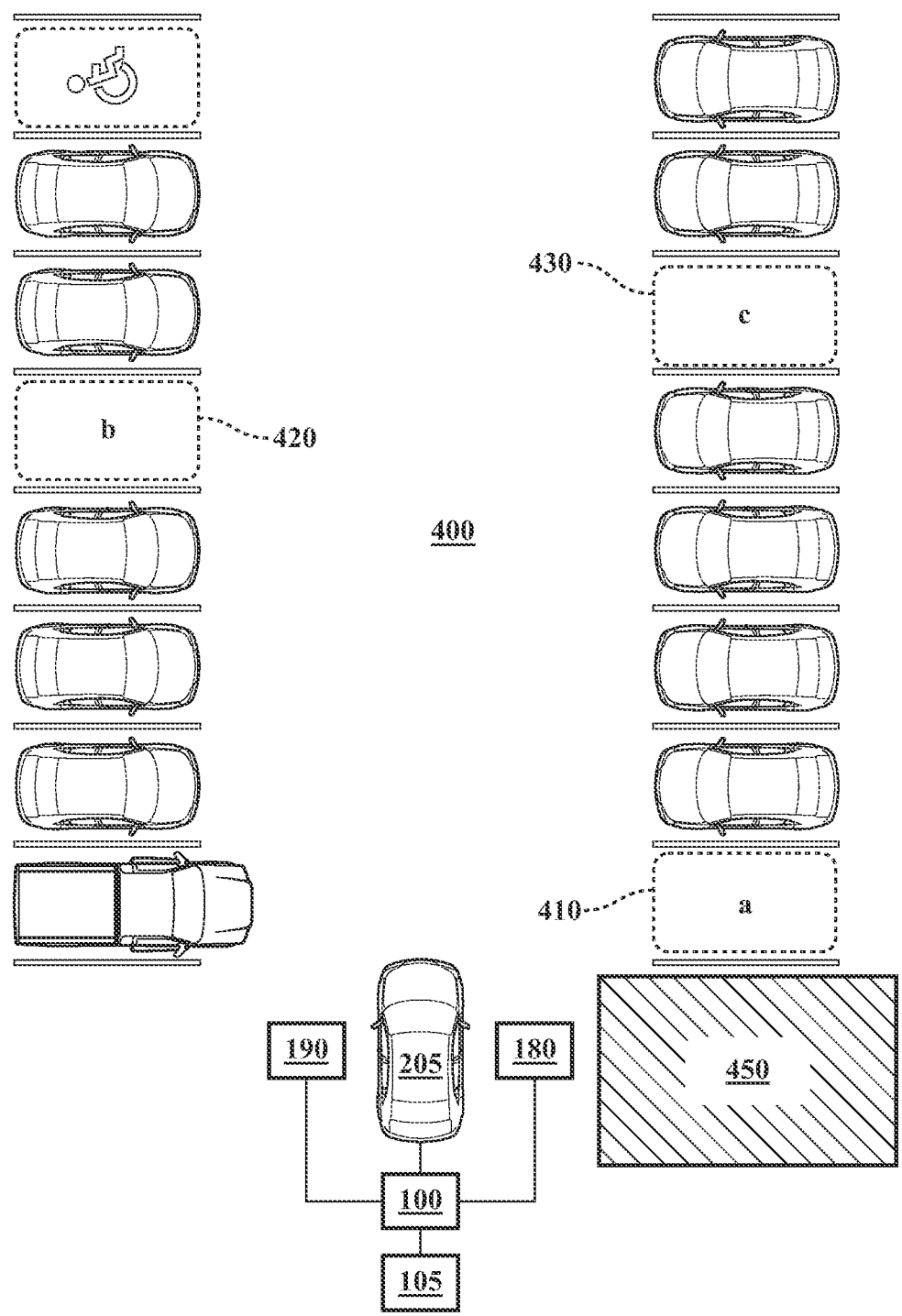
FIG. 4 illustrates an example of a vehicle approaching candidate parking spaces according to the disclosed subject matter.

FIG. 4 shows an example of the subject vehicle 205 arriving at a parking area 400 at which the parking navigation system 105 has identified a set [a, b, c ... n] of available parking spaces, e.g., including parking spaces 410, 420, 430. The parking area 400 can include, for example, an EV charging station 450. When the parking preference estimation system 100 receives the set of candidate parking spaces from the parking navigation system 105, the parking preference estimation system 100 determines whether a threshold amount of data associated with the subject vehicle 205 has been obtained to create a decision model.

When the parking preference estimation system 100 determines that the parking preference estimation system 100 has not obtained the threshold amount of data, no further recommendation/estimation action is taken for this parking event. When the parking preference estimation system 100 determines that the parking preference estimation system 100 has obtained the threshold amount of data, the parking preference estimation system 100 generates a decision model specific to the subject vehicle 205 to estimate which candidate the driver of the subject vehicle 205 would prefer.

In a utility function implementation, the parking preference estimation system 100 first calculates criterion-wise scores of each candidate parking space in the received set [a, b, c . . . n] of available parking candidates. In an implementation in which the parking preference estimation system 100 uses regression techniques to estimate the utility function $f_j$, the parking preference estimation system 100 applies the function to the criterion-wise scores to calculate the utility of each candidate parking space. In one or more embodiments, the parking preference estimation system 100 can rank the candidate parking spaces in a descending order of the utility and return the results to the parking navigation system 105. The parking navigation system 105 can determine the candidate with the highest utility as estimated to be the driver's most preferred parking space out of the set and generate instructions to navigate to the candidate parking spaces in order of rank until a parking space is obtained and the parking event thereby ends.

In an implementation in which the parking preference estimation system 100 uses decision trees to model drivers' parking selection, the parking preference estimation system 100 estimates results of pair-wise comparisons of all possible pairs of candidate parking spaces within the set. The candidate determined to be preferable to the largest number of other candidates is estimated to be the driver's preferred parking space out of the set.

For example, assume the set is limited to three candidate parking spots, a set of [a, b, c] (e.g., parking spaces 410, 420, 430). The parking preference estimation system 100 applies the decision tree associated with subject vehicle 205 to all the possible pairs within the set: (a, b), (b, c) and (c, a). For each pair, the parking preference estimation system 100 estimates which spot is likely to be preferred by the driver of subject vehicle 205. The following represents example comparison results:

a is preferred to b
b is preferred to c
a is preferred to c

In this example case, parking space a is estimated to be the most preferable spot as parking spot a is preferred over the largest number (2) of other candidate spots. Accordingly, the parking preference estimation system 100 can return parking space a as output to the parking navigation system 105 in response to an input of set [a, b, c]. The parking navigation system 105 can generate navigational directions to parking space a.

Figure 5:
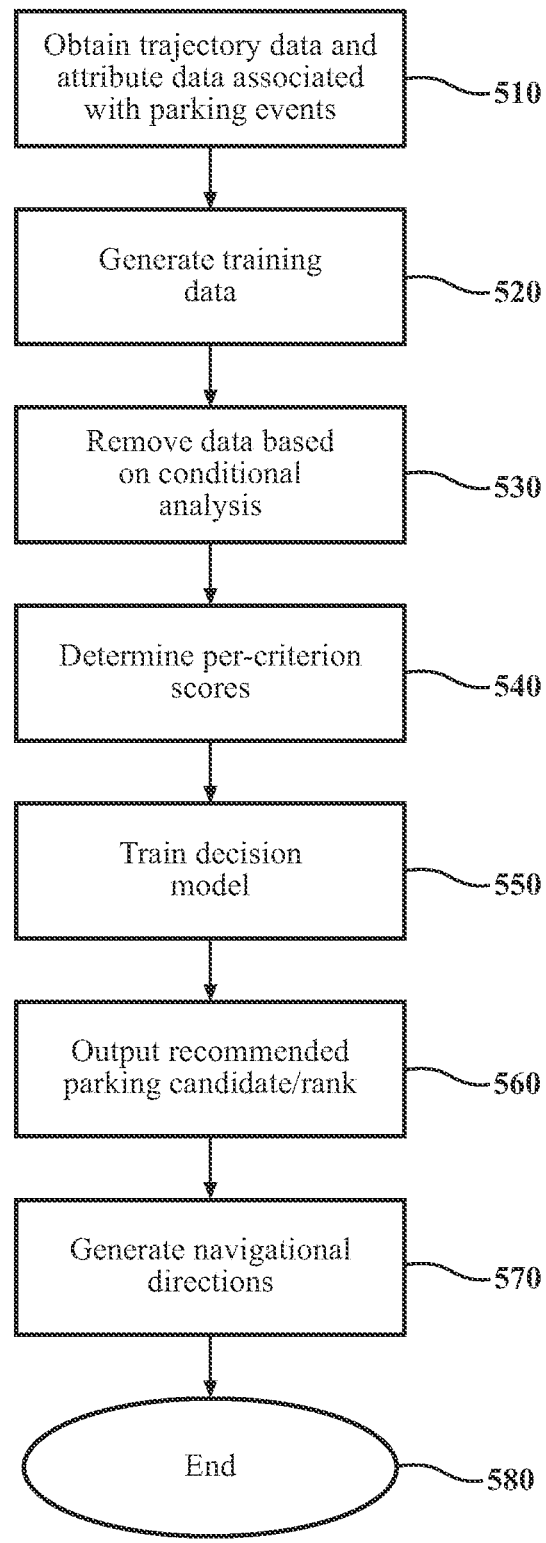
FIG. 5 illustrates an example flowchart of operations of a parking preference estimation system according to the disclosed subject matter.

FIG. 5 shows a flowchart 500 of operations for one or more embodiments of the disclosed parking preference estimation system 100. It should be clear that the order in which the operations are described is not intended to be construed as a limitation, and any number of the described operations can occur in any order and/or in parallel in actual implementation of the disclosed embodiments. Additionally, any specific reference to one or more operations being capable of being performed in a different order is not to be understood as suggesting that other operations may not be performed in another order.

At operation 510 the parking preference estimation system 100 (e.g., training module 140) obtains trajectory data associated with a subject vehicle during a plurality of parking events and attribute data associated with a plurality of parking candidates disposed along search paths of the plurality of parking events.

At operation 520 the parking preference estimation system 100 (e.g., training module 140) generates training data based at least in part on: 1) trajectory data indicating a trajectory of a vehicle during the plurality of parking events, each in which a driver of the vehicle selected a parking candidate from among a plurality of parking candidates, and 2) attribute data indicating attributes of each of the plurality of parking candidates.

At operation 530 the parking preference estimation system 100 (e.g., training module 140) removes, from the training data, data associated with at least one parking candidate based on one or more conditions that indicate the driver did not consider the at least one parking candidate. The one or more conditions can include the vehicle moving above a threshold speed when passing the at least one parking candidate, the vehicle passing the at least one parking candidate at a lateral distance above a threshold amount, and the vehicle accelerating above a threshold rate while passing the at least one parking candidate.

At operation 540 the parking preference estimation system 100 (e.g., score module 130) determines, for each of a plurality of attributes associated with parking candidates represented in the remaining training data, a score that characterizes a corresponding attribute (e.g., per-criterion scores).

At operation 550 the parking preference estimation system 100 (e.g., decision module 150) trains a decision model, based on remaining training data, to estimate a preferred parking candidate for the driver from among a set of available parking candidates. In one or more embodiments, the decision module 150 determines a utility function for the decision model that approximates the driver's preference based on scores associated with selected parking candidates and unselected parking candidates represented in the remaining training data.

At operation 560 the parking preference estimation system 100 (e.g., decision module 150) receives an input of a plurality of available parking candidates (e.g., from the parking navigation system 105), outputs a recommended parking candidate according to the decision model. In one or more embodiments the decision module 150 can output a ranking of available parking candidates.

At operation 570 the parking navigation system 105 generates navigational directions to the recommended parking candidate, or top ranked available parking candidate. The process ends at 580.

Accordingly, the disclosed parking preference estimation system 100 and parking navigation system 105 provides a highly automated system for learning driver parking preferences, generating parking recommendations that accurately estimate the driver's preference, and providing navigational directions to a recommended parking candidate.

Additionally, it should be appreciated that the parking preference estimation system 100 and the parking navigation system 105 from FIG. 1 can be configured in various arrangements with separate integrated circuits and/or chips. In such embodiments, the training module 140 from FIG. 1 can be embodied as a separate integrated circuit. Additionally, the score module 130 and the decision module 150 can each be embodied on individual integrated circuits. The circuits can be connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the modules 130, 140 and 150 may be combined into a separate application-specific integrated circuit. In other embodiments, portions of the functionality associated with the modules 130, 140 and 150 may be embodied as firmware or instructions executable by a processor and stored in a non-transitory memory. In still further embodiments, the modules 130, 140 and 150 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., shown in flowchart 500 of FIG. 5) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The parking preference estimation system 100 can include one or more processors 110. In one or more arrangements, the processor(s) 110 can be a main processor of the parking preference estimation system 100. For instance, the processor(s) 110 can be an electronic control unit (ECU). The parking preference estimation system 100 can include one or more data stores 160 for storing one or more types of data. The data stores 160 can include volatile and/or non-volatile memory. Examples of suitable data stores 160 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores 160 can be a component of the processor(s) 110, or the data store 160 can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing machine-readable instructions that, when executed by the processor, cause the processor to:
generate training data based at least in part on: 1) trajectory data indicating a trajectory of a vehicle during a plurality of parking events, each in which a driver of the vehicle selected a parking candidate from among a plurality of parking candidates, and 2) attribute data indicating attributes of each of the plurality of parking candidates;
remove, from the training data to produce remaining training data, data associated with at least one available parking candidate based on one or more conditions that indicate the driver did not consider the at least one available parking candidate;
determine, for each of a plurality of attributes, a score that characterizes an attribute of the plurality of attributes, the plurality of attributes being associated with parking candidates represented in the remaining training data;
determine a utility function for a decision model that approximates preferences of the driver based on scores associated with selected parking candidates and unselected parking candidates represented in the remaining training data; and
train the decision model, based on the remaining training data, to estimate a preferred parking candidate for the driver from among a set of available parking candidates.

2. The system of claim 1, wherein the memory further stores instructions to:
receive an input of a plurality of available parking candidates;
output a recommended parking candidate according to the decision model; and
generate navigational directions to the recommended parking candidate.

3. The system of claim 1, wherein the one or more conditions include one or more of:
the vehicle moving above a threshold speed when passing the at least one available parking candidate,
the vehicle passing the at least one available parking candidate at a lateral distance above a threshold amount, or
the vehicle accelerating above a threshold rate while passing the at least one available parking candidate.

4. The system of claim 1, wherein the utility function is determined using linear regression, logistic regression, or deep neural network-based regression.

5. The system of claim 1, wherein the available parking candidates are parking facilities within a geographical area.

6. The system of claim 1, wherein the available parking candidates are parking spaces within a parking facility.

7. A method, comprising:
generating training data based at least in part on: 1) trajectory data indicating a trajectory of a vehicle during a plurality of parking events, each in which a driver of the vehicle selected a parking candidate from among a plurality of parking candidates, and 2) attribute data indicating attributes of each of the plurality of parking candidates;
removing, from the training data to produce remaining training data, data associated with at least one available parking candidate based on one or more conditions that indicate the driver did not consider the at least one available parking candidate;
determining, for each of a plurality of attributes, a score that characterizes an attribute of the plurality of attributes, the plurality of attributes being associated with parking candidates represented in the remaining training data;
determining a utility function for a decision model that approximates preferences of the driver based on scores associated with selected parking candidates and unselected parking candidates represented in the remaining training data; and
training the decision model, based on the remaining training data, to estimate a preferred parking candidate for the driver from among a set of available parking candidates.

8. The method of claim 7, further comprising:
receiving an input of a plurality of available parking candidates;
outputting a recommended parking candidate according to the decision model; and
generating navigational directions to the recommended parking candidate.

9. The method of claim 7, wherein the one or more conditions include one or more of:
the vehicle moving above a threshold speed when passing the at least one available parking candidate,
the vehicle passing the at least one available parking candidate at a lateral distance above a threshold amount, or
the vehicle accelerating above a threshold rate while passing the at least one available parking candidate.

10. The method of claim 7, wherein the utility function is determined using linear regression, logistic regression, or deep neural network-based regression.

11. The method of claim 7, wherein the available parking candidates are parking facilities within a geographical area.

12. The method of claim 7, wherein the available parking candidates are parking spaces within a parking facility.

13. A non-transitory computer-readable medium including instructions that when executed by one or more processors cause the one or more processors to:
generate training data based at least in part on: 1) trajectory data indicating a trajectory of a vehicle during a plurality of parking events, each in which a driver of the vehicle selected a parking candidate from among a plurality of parking candidates, and 2) attribute data indicating attributes of each of the plurality of parking candidates;
remove, from the training data to produce remaining training data, data associated with at least one available parking candidate based on one or more conditions that indicate the driver did not consider the at least one available parking candidate;
determine, for each of a plurality of attributes, a score that characterizes an attribute of the plurality of attributes, the plurality of attributes being associated with parking candidates represented in the remaining training data;
determine a utility function for a decision model that approximates preferences of the driver based on scores associated with selected parking candidates and unselected parking candidates represented in the remaining training data; and
train the decision model, based on the remaining training data, to estimate a preferred parking candidate for the driver from among a set of available parking candidates.

14. The non-transitory computer-readable medium of claim 13, further comprising instructions to:
receive an input of a plurality of available parking candidates;
output a recommended parking candidate according to the decision model; and
generate navigational directions to the recommended parking candidate.

15. The non-transitory computer-readable medium of claim 13, wherein the one or more conditions include one or more of:
the vehicle moving above a threshold speed when passing the at least one available parking candidate,
the vehicle passing the at least one available parking candidate at a lateral distance above a threshold amount, or
the vehicle accelerating above a threshold rate while passing the at least one available parking candidate.

16. The non-transitory computer-readable medium of claim 13, wherein the utility function is determined using linear regression, logistic regression, or deep neural network-based regression.

17. The non-transitory computer-readable medium of claim 13, wherein the available parking candidates are parking spaces within a parking facility.

18. The system of claim 1, wherein an attribute, of the attributes, comprises at least one of a physical characteristic of a parking space, a contextual characteristic of the parking space, or a regulatory characteristic of the parking space.

19. The method of claim 7, wherein an attribute, of the attributes, comprises at least one of a physical characteristic of a parking space, a contextual characteristic of the parking space, or a regulatory characteristic of the parking space.

20. The non-transitory computer-readable medium of claim 13, wherein an attribute, of the attributes, comprises at least one of a physical characteristic of a parking space, a contextual characteristic of the parking space, or a regulatory characteristic of the parking space.

* * * * *